United States Patent [19]

Glass et al.

[11] 4,271,412
[45] Jun. 2, 1981

[54] RANGE TRACKER UTILIZING SPECTRAL ANALYSIS

[75] Inventors: Jeremy M. Glass, Sudbury; George G. Lampke, Acton; Roger L. St. Germain, Marlboro, all of Mass.

[73] Assignee: Raytheon Company, Lexington, Mass.

[21] Appl. No.: 84,491

[22] Filed: Oct. 15, 1979

[51] Int. Cl.³ .............................................. G01S 13/32
[52] U.S. Cl. ............................... 343/5 FT; 343/5 SA; 343/7 A; 343/14
[58] Field of Search ................. 343/5 FT, 5 SA, 7 A, 343/14

[56] References Cited

U.S. PATENT DOCUMENTS

| | | |
|---|---|---|
| 3,898,655 | 8/1975 | Tresselt . |
| 3,987,285 | 10/1976 | Perry . |
| 4,014,022 | 3/1977 | Weinberg . |
| 4,015,260 | 3/1977 | Campbell, Jr. . |
| 4,053,885 | 10/1977 | Tomita et al. . |

Primary Examiner—T. H. Tubbesing
Attorney, Agent, or Firm—William R. Clark; Milton D. Bartlett; Joseph D. Pannone

[57] ABSTRACT

A radar system transmits a signal to a target wherein the frequency is modulated with a sinusoidal modulation pattern. The difference between the actual target range and an estimate thereof is subjected to a spectral analysis wherein the spectral terms are described by Bessel functions. A second order range tracking loop, responsive to the relative magnitudes of the spectral terms, and an estimator of target radial acceleration, responsive to successive values of the spectral terms, provide components of the range estimate.

10 Claims, 7 Drawing Figures

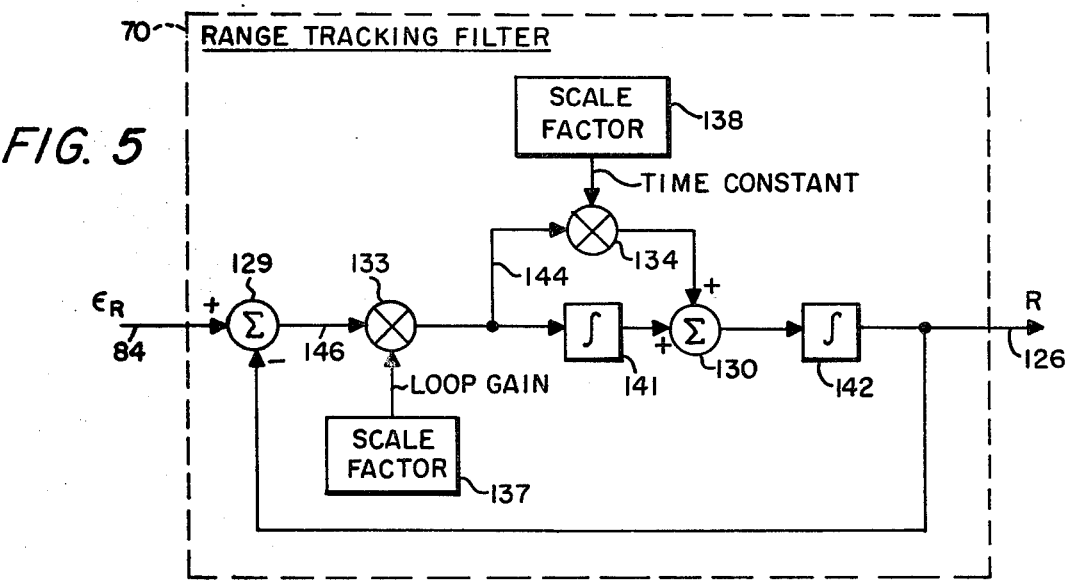
FIG. 5
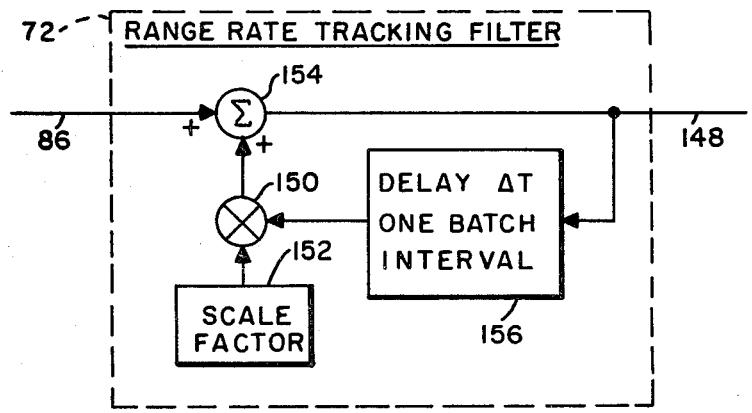
FIG. 6
FIG. 7
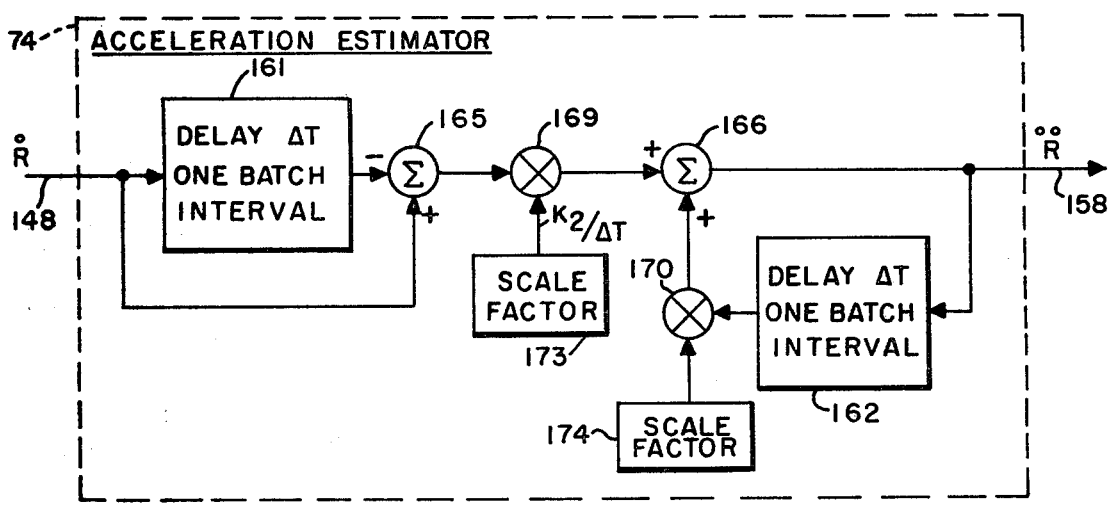

RANGE TRACKER UTILIZING SPECTRAL ANALYSIS

BACKGROUND OF THE INVENTION

Radars have generally used analog signal processing for a tracking loop to maintain output data of range, velocity and/or acceleration data for subsequent use. However, accuracy of such systems is limited due to, among other things, shifting of the frequency spectrum of the returned echo due to motion of the antenna or motion of the echo producing target with respect to the antenna. Attempts to improve the accuracy by digitizing the signals and utilizing digital processing accentuate these errors particularly if the processing converts signals from the time domain to the frequency domain, for example, in a fast fourier transformer since the errors now show up as shifts in the frequency components.

SUMMARY OF THE INVENTION

The aforementioned problem is overcome and other advantages are provided by an FMCW system for radar and sonar which provides an estimate of target range as well as a measurement of the radial components of target velocity and acceleration. In accordance with the invention, the system incorporates a spectrum analysis of the difference between the actual range of the target and the estimated range of the target to accomplish a measurement of the target range which is substantially free of the aforementioned error resulting from the radial components of target velocity and acceleration. The system includes analog-to-digital converters for converting the analog radar signals to a digital format. The difference between the actual and the estimated ranges is accomplished by a mixing of the received target echo signal with a replica of the transmitted signal, the replica being suitably modified, in a manner to be described, to provide an estimate of range which is free of the radial velocity and radial acceleration of the target. The mixing may be accomplished by analog or digital multiplication employing both real and imaginary components to provide complex digital signals suitable for use by a fast Fourier transformer. The difference signal appearing at the output of the mixer is then applied to a fast Fourier transformer (FFT) which provides a spectrum analysis of the difference signal, the spectrum analysis comprising a set of complex digital frequency terms which are obtained from a set of samples of the difference signal.

In a preferred embodiment of the invention, the transmitted continuous wave signal is modulated in frequency with a sinusoidal pattern, the sinusoidal pattern providing Fourier frequency components which are described by Bessel functions. The period of the sinusoidal pattern is much longer, an exemplary ten times longer, than the round-trip propagation time of a radar signal, or sonar signal, propagating between the system and the target. Thereby, the measurement of range is accomplished by using the quasi-linear region of the sinusoidal pattern. The spacing between the spectral lines is dependent on the repetition frequency of the sinusoidal modulation pattern as well as on the relative movement between the target and the radar system. For stationary targets, the spacing of the spectral lines is constant. For targets having a constant radial component of velocity, the spectrum is scaled but, for adequate measurement accuracy, the spacing between the lines may still be regarded as being constant. However, for the case of a radial component of acceleration of the target, the spacing and magnitudes of the spectral lines are so altered that a linear sweep of frequency modulation must be applied to the replica signal to compensate for the acceleration term. Accordingly, the system is provided with a second order tracking loop, responsive to the relative magnitudes of the spectral terms, and an estimator of target radial acceleration, responsive to successive values of the spectral terms, which individually modify the replica signal so as to cancel the effects of the Doppler induced modulation on the echo signal. Thereby, a precise measurement of the range can be made by comparing the echo with the modified replica. The preferred embodiment of the invention will be described with reference to a radar, it being understood that the teachings apply also to sonar for underwater target location and medical ultrasound for noninvasive imaging or moving organs in a living organism.

BRIEF DESCRIPTION OF THE DRAWINGS

The aforementioned aspects and other features of the invention are explained in the following description taken in connection with the accompanying drawings wherein:

FIG. 5 is a block diagram of a range tracking filter of FIG. 1;

FIG. 6 is a block diagram of a range rate tracking filter of FIG. 1; and

FIG. 7 is a block diagram of an acceleration estimator of FIG. 1.

DESCRIPTION OF THE PREFERRED EMBODIMENT

Figure 1:
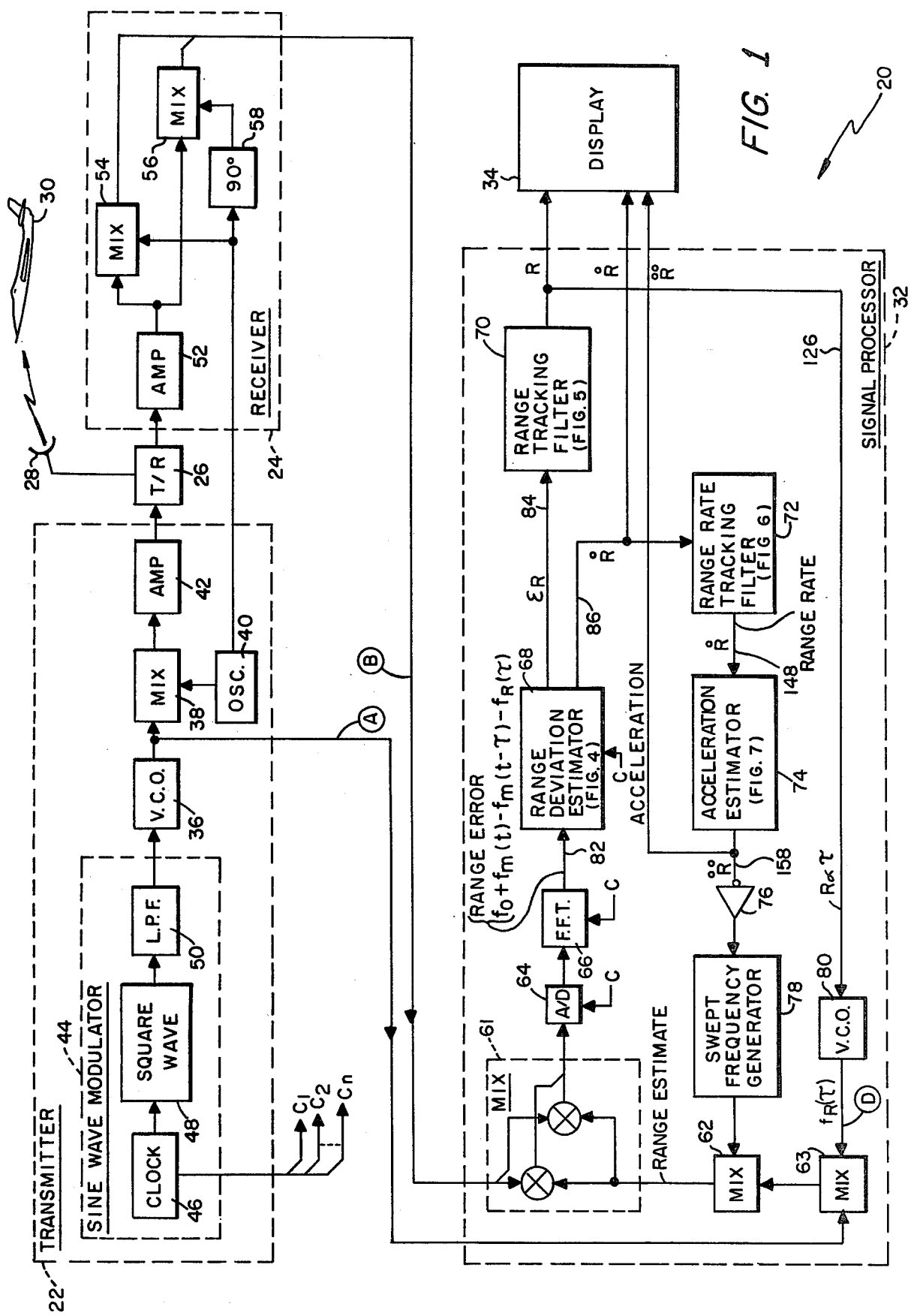
FIG. 1 is a block diagram of a radar system incorporating the invention.
Figure 2:
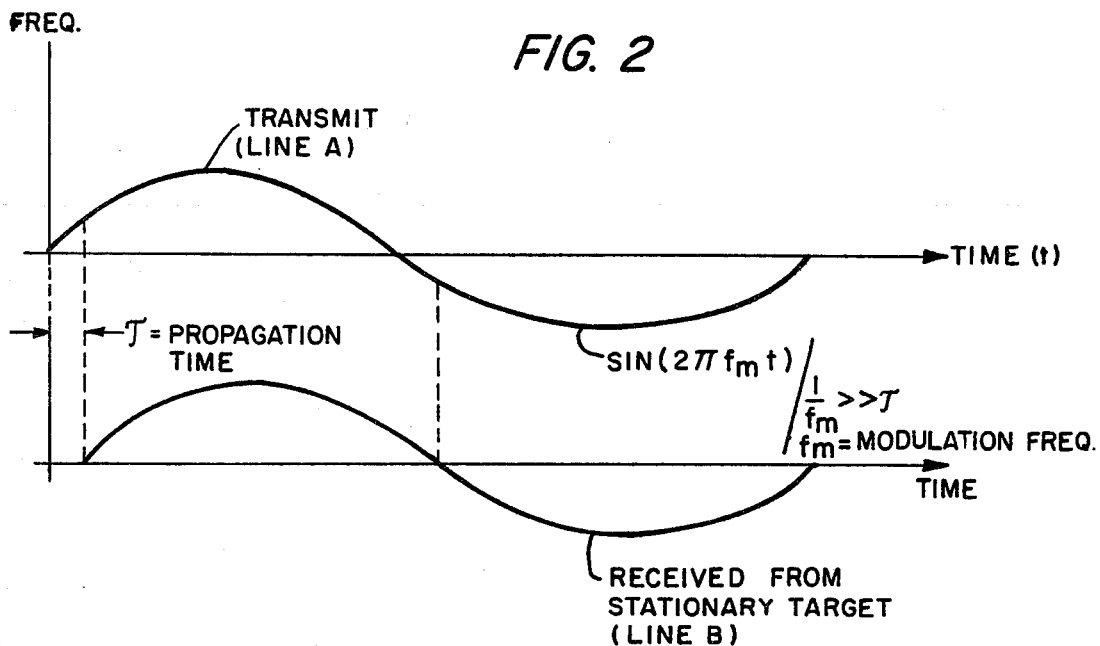
FIG. 2 shows waveforms of signals on lines A and B of FIG. 1.

Referring now to FIGS. 1 and 2, there is seen a radar system 20 comprising a transmitter 22 and a receiver 24 which are coupled via a transmit-receive circuit 26 to an antenna 28 for transmitting signals to a target, shown as an exemplary aircraft 30, and for receiving echoes therefrom. The system 20 further comprises a signal processor 32 and a display 34, the processor 32 being coupled to both the transmitter 22 and the receiver 24 for extracting range and range rate data therefrom and presenting the data on the display 34.

The transmitter 22 comprises a voltage controlled oscillator 36, a mixer 38, an oscillator 40 which provides the carrier frequency, an amplifier 42, and a modulator 44 which modulates the frequency of the oscillator 36. The modulator 44 comprises a clock 46, a square wave generator 48 and a low pass filter 50. The modulator 44 provides a sinusoidal waveform at a frequency designated by clock pulses of the clock 46. The generator 48, in response to the clock pulses of the clock 46, provides a square waveform signal which is applied to the filter 50. The filter 50 extracts the fundamental component of the square wave, the fundamental component being a sine wave signal which has the desired frequency and is applied to the oscillator 36 for modulating the frequency thereof. For example, the oscillator 36 may produce a nominal frequency of 10 megahertz (MHz) which is modulated at an exemplary modulation frequency of 100 hertz (Hz) with a frequency deviation of 100 kilohertz (kHz). The carrier frequency of the oscillator 40 may have an exemplary value of 10 gigahertz (GHz), the mixer 38 being coupled to both the oscillators 36 and 40 for translating the signal of the oscillator 36 to the x-band carrier of the oscillator 40. The signal of the mixer 38 is amplified by the amplifier 42 to a power level suitable for transmission to the target aircraft 40.

The receiver 24 is seen to comprise an amplifier 52, mixers 54 and 56, and a 90° phase shifter 58. The amplifier 52 amplifies the echo received from the aircraft 30 to a suitable amplitude for operating the mixers 54 and 56, the amplifier 52 being understood to include a bandpass filter which is tuned to the frequency of the echo as is well known in radar systems. A reference signal from the oscillator 40 is applied directly to the mixer 54 and, via the phase shifter 58, to the mixer 56 for providing in-phase and quadrature translation of the echo signal to in-phase and quadrature intermediate frequencies (IF). The IF signals of the mixers 54 and 56 are seen to fan into line B whereby they are coupled to the processor 32. Also, a reference signal from the oscillator 36 is coupled via line A to the processor 32 to permit a comparison between the transmitted signal and the echo signal.

As seen in FIG. 2, the signals on the lines A and B have the same frequency modulation pattern, the pattern on line B being delayed from that on line A. The clock 46 of FIG. 1 serves as the source of timing signals, identified by the legend C, for the elements of the processor 32 as well as for generating the modulation waveform to provide a common time base for the measurement of the target range. As seen in FIG. 2, the period of the modulation waveform is much longer than the propagation time of the signal from the antenna 28 to the target and back to the antenna 28. Thereby, a measurement utilizing the leading edges of the modulation waveform is performed within a substantially linear region of the sinusoidal waveform.

Figure 3:
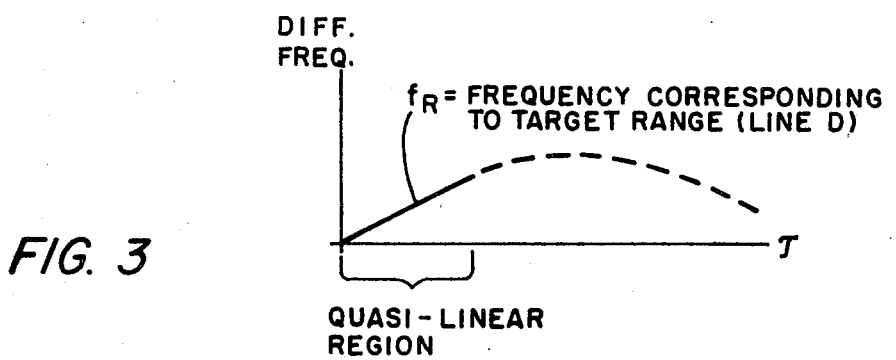
FIG. 3 shows a frequency difference as a function of time for various round-trip propagation times of the radar signal between an antenna and a target aircraft of FIG. 1, FIG. 3 representing the difference in frequency between the two graphs of FIG. 2.

Referring also to FIG. 3, there is seen a graph of the frequency difference between the frequencies of the modulation waveforms of the two graphs in FIG. 2. For durations of propagation time to the target which are small compared to the period of the modulation waveform, FIG. 3 shows a substantially linear relationship of frequency difference versus propagation delay. The range of the target is proportional to the propagation delay and, accordingly, the delay serves as a measure of the target range.

In accordance with the invention, it is noted that the use of the sinusoidal frequency modulation provides a spectrum to both the transmitted signal and the echo which has the form of a line spectrum wherein the spectral lines are spaced apart by multiples of the modulation frequency. The processor 32 provides a range estimate in the form of a signal having the same modulation as the echo and which coincides temporally therewith. By matching the delay of the estimate with the propagation delay of the echo, the processor 32 obtains the range of the target. As will be described hereinafter, in accordance with the invention, the processor 32 utilizes the spectral components for adjusting the range estimate to provide coincidence between the signal representing the range estimate and the echo signal. In view of the frequency modulation, the range data is obtained from a frequency measurement. Furthermore, since the processor 32 employs a feedback loop wherein the frequency of the range estimate is compared to the frequency of the echo, as will be described hereinafter, the measurements are obtained in the manner of a sliding window in the frequency spectrum wherein the sliding is due to a Doppler shift associated with movement of the target. Thus, a feature of the inventive processing of the echo signal is the capability to perform the range measurement independently of the Doppler frequency, a single term of the spectrum, the $J_O$ Bessel term as will be described hereinafter, being found in the loop error signal when a proper match is obtained between the range estimate and the echo. Thus, the target radial velocity may be regarded as being normalized during the signal processing of the processor 32 since the measurement is accomplished independently of the magnitude of the radial velocity.

The processor 32 is seen to comprise three mixers 61-63, an analog-to-digital converter 64, a fast Fourier transformer 66, a range deviation estimator 68 which will be described with reference to FIG. 4, a range tracking filter 70 which will be described in FIG. 5, a range rate tracking filter 72 which will be described with reference to FIG. 6, an acceleration estimator 74 which will be described with reference to FIG. 7, a digital inverter 76, a swept frequency generator 78 and a voltage controlled oscillator 80. The mixer 61 is seen to comprise two sections, one for the in-phase signal and one for the quadrature signal on line B. The mixer 61 is seen to comprise two sections, one for the in-phase signal and one for the quadrature signal on line B. The mixer 61 provides a pair of output signals, one from each section of the mixer 61, each section of the mixer 61 being understood to include well-known bandpass filters for extracting output signals having frequencies equal to the difference in frequency between the signals on line B and the signal, identified in the Figure as the range estimate, from the mixer 62. The converter 64 is similarly understood to include two sections for converting each signal of the pair of signals from the mixer 61 to a pair of digital signals which form the real and imaginary parts of a complex digital signal provided by the converter 64 and applied to the transformer 66. The converter 64 is strobed by clock pulses from the clock 46 for sampling the signals of the mixer 61 at a rate equal to, and preferably somewhat greater than, the Nyquist sampling rate.

The transformer 66, as is well known, in response to clock signals of the clock 46, accepts a sequence of the complex digital samples from the inverter 64 to provide a sequence of complex digital numbers representing the magnitude and phase of a set of Fourier spectral components of the output signal of the mixer 61. The spacing between the spectral lines, in the frequency domain, is dependent on the number of samples in the foregoing sequence, a larger number of samples in the sequence providing a finer resolution of the spectrum. For example, in the situation wherein the modulating frequency of the modulator 44 has been selected at 100 Hz, in which case the spectral lines of the output signal of the mixer 61 are spaced apart at intervals of 100 Hz, the transformer 66 is advantageously provided with a spectral resolution of a smaller frequency increment, an exemplary 50 Hz, for making an accurate measurement of Doppler frequency. With respect to the sampling rate of the transformer 66, the foregoing sequence, or batch, of input samples to the transformer 66 occupies an interval of time which may be referred to as the batch interval. Thus, one set of spectral lines is obtained per batch interval. And, similarly, with respect to a single line of the spectrum such as the line for the $J_0$ term of the spectrum, samples of the $J_0$ term appear at the output terminal of the transformer 66 at a rate wherein the intersample interval is equal to the batch interval. As a further example, if the converter 64 is strobed at a rate of 100 kHz, and a sequence of 1024 samples is employed for each batch, then Doppler data of a moving target is obtained from the $J_0$ term at a rate of approximately 100 samples per second.

In the embodiment of FIG. 1, it is noted that the mixers 61–63 provide an analog mixing function. By way of alternative embodiments, it is noted that the mixers 61–63 may be composed of digital multipliers for accomplishing the mixing functions digitally. To accomplish the alternative digital implementation of the mixers 61–63, as may be desirable in the situation wherein the entire processor 32 is to be accomplished by digital microcircuits, the converter 64 would be placed in line B to provide digital signals for the mixer 61, the output terminal of the mixer 61 being coupled directly to the transformer 66. Similarly, an additional converter (not shown) would be provided in line A for converting the reference signal therein to a digital format for the mixer 63.

The processor 32 is constructed in a feedback configuration having both an outer loop and an inner loop. The outer loop is seen to comprise the converter 64, the transformer 66, the estimator 68, the range tracking filter 70, the oscillator 80, and the mixers 61–63. The inner loop shares the converter 64, the transformer 66, and the range deviation estimator 68 with the outer loop. The inner loop further comprises the range rate tracking filter 72, the acceleration estimator 74, the inverter 76, and the swept frequency generator 78, the inner loop being closed by the mixers 61 and 62. The inner loop compensates for movement of the target relative to the antenna, the compensation permitting the outer loop to function as though the target were stationary. Accordingly, in analyzing the operation of the outer loop, it may be presumed that the target is stationary.

The error signal for the feedback configuration is found at the output terminal of the transformer 66. As can be seen with reference to FIGS. 2 and 3, the data provided by the system 20 is in the form of a frequency and its time of occurrence. The frequency resulting from the mixing of the range estimate with the target echo on line B, as shown in FIG. 1 adjacent the transformer 66, is seen to be composed of the sum of a fixed term $F_o$ plus the modulation $f_m(t)$ provided by the modulator 44 as a function of time, plus the modulation $f_m(t-\tau)$ as delayed by the round-trip propagation time $\tau$ to the aircraft 30, plus a term $f_R(\tau)$, which is provided by the oscillator 80 and is proportional to the propagation time $\tau$ and the range R. The frequency components resulting from the mixing of the range estimate with the target echo on line B are extracted by the transformer 66. Accordingly, the signal provided by the transformer 66 is identified as the range error in FIG. 1.

The feedback configuration provides a waveform, namely, the waveform of the aforementioned range estimate, which has the same form as the echo signal received on line B, this being accomplished with the aid of the transmitted reference signal on line A. Thus, the reference signal on line A provides the processor 32 with the requisite waveform, while the processor 32 provides the compensation for the round-trip propagation delay between the antenna 28 and the target to provide the range estimate in temporal coincidence with the echo on line B. In the case of a stationary target, there is a direct relationship between the frequency of the echo and the target range as may be seen with reference to FIGS. 2 and 3. The frequency difference increases with target range or, equivalently, the round-trip propagation time. As was noted hereinabove, the modulation waveform has a period much longer than that of the propagation time, the frequency difference between the two graphs of FIG. 2 rising linearly as a function of range for propagation times which are relatively short compared to the period of the modulation. The linearity drops off for larger values of propagation time as is shown by a dashed portion of the trace of FIG. 3. Accordingly, the delay compensation to be provided by the processor 32 is accomplished by offsetting the frequency of the reference signal of line A. In the case of a stationary target, the offsetting is fully accomplished by the oscillator 80 providing the signal on line D to the mixer 63, the frequency of that signal being portrayed in FIG. 3. In the event of a moving target, the compensation of the inner loop provides an additional frequency offset of the generator 78 which is combined with that of the oscillator 80 by means of the frequency addition of the mixers 63 and 62. Accordingly, the voltage applied to the oscillator 80 for controlling its frequency is proportional to the propagation time and to the target range (or loop range in the case of a bi-static radar system, not shown) in both the cases of a stationary target and a moving target.

Figure 4:
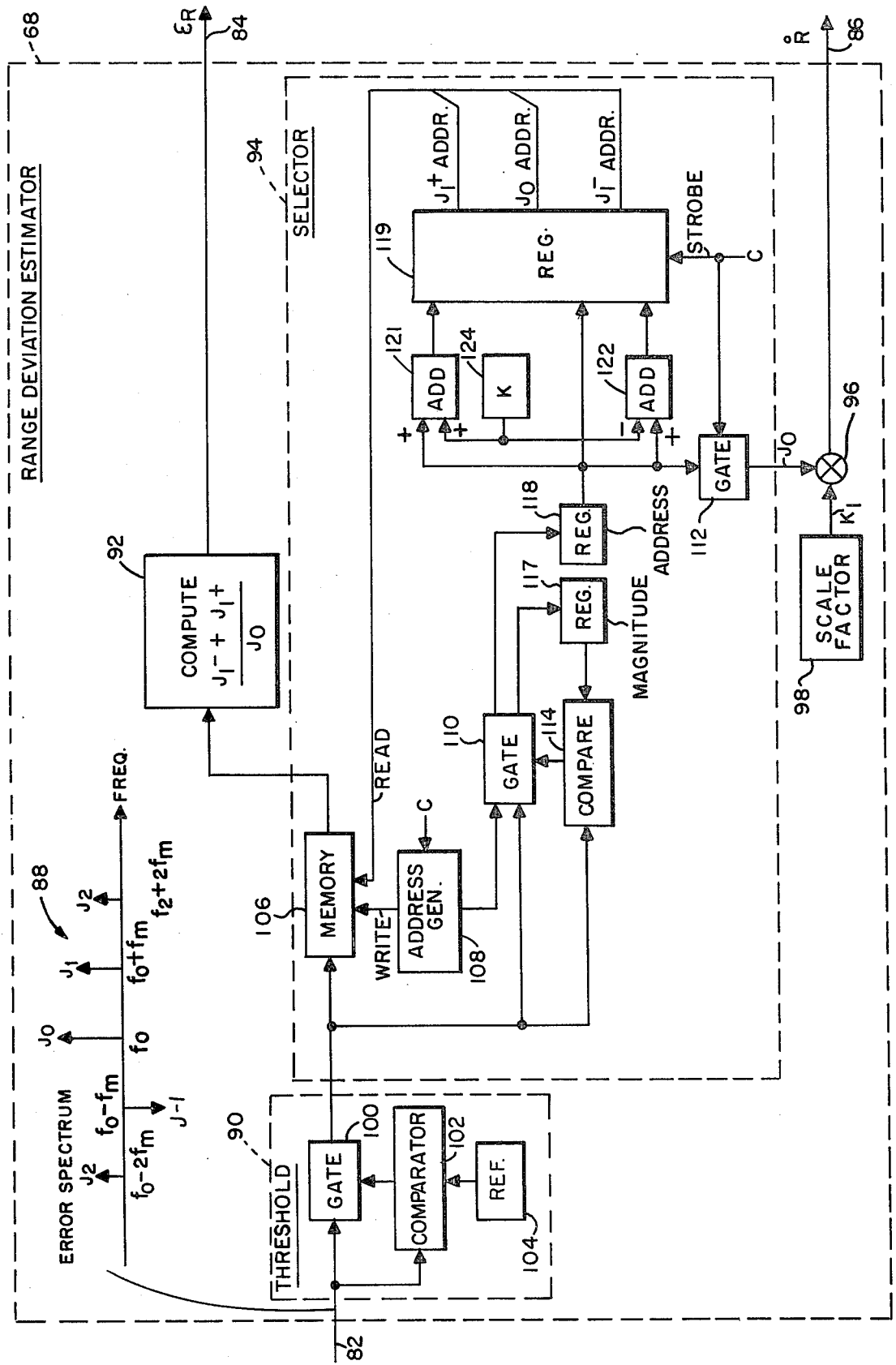
FIG. 4 is a block diagram of a range deviation estimator of FIG. 1.

Referring now to FIG. 4, the range deviation estimator 68 receives the range error on line 82 from the transformer 66 in the form of spectral lines, and provides on line 84 a voltage having an amplitude proportional to the range error. The estimator 68 provides on line 86 a voltage having a magnitude proportional to the range rate. In the upper left corner of FIG. 4 is presented an exemplary graph 88 of the signal on line 82 for the situation wherein the range estimate of FIG. 1 does not fully coincide with the target echo on line B of FIG. 1. Such a spectrum is characteristic of a sinusoid wherein the frequency thereof is modulated with a sinusoidal modulation pattern, the spectrum being described in the book "Reference Data for Radio Engineers", fifth edition, published by Howard W. Sams & Co. in 1968, at pages 21-7 and 21-8. The spectrum of the graph 88 has lines at the specific frequencies, or output slots, of the transformer 66 of FIG. 1. The spectrum of the graph 88 is seen to be a line spectrum with the magnitudes of the frequency components being given by Bessel terms, the lines being spaced apart in increments of the modulation frequency.

When the range estimate is in temporal coincidence with the received echo, only the $J_0$ term appears in the spectrum. The magnitude of the $J_0$ term is proportional to the strength, or amplitude, of the received echo signal. Its location, or address, along the frequency axis is proportional to the range rate, or Doppler frequency, of the target. In view of the aforementioned exemplary spacing of 50 Hz between the output frequency slots of the transformer 66, the possible locations of the $J_0$ term are quantized to increments of 50 Hz along the frequency axis. In the event that the range estimate does not fully coincide temporally with the received echo, then the higher Bessel terms, such as the $J_1$ and the $J_2$ terms, appear. The ratio of the magnitude of the sum of the $J_1$ term to the magnitude of the $J_0$ term is a measure of the lack of temporal coincidence and, hence, a measure of the error signal for the outer loop of the processor 32. In the event of target acceleration in the radial direction between the antenna 28 and the target aircraft 30 of FIG. 1, the spectral lines of the graph 88 are seen to broaden, the broadening being manifested by the appearance of digital terms at neighboring output frequency slots of the transformer 66 with a diminution of the amplitude of the various spectral lines of the graph 88. The higher-order spectral lines constitute a residual frequency modulation which is utilized by the estimator 68 to provide the error signals on the lines 84 and 86 which drive the outer and inner loops of the processor 32 to bring the range estimate into coincidence with the received echo. A shifting of the position of the $J_0$ term to the right indicates that the target is drawing near to the antenna 28, while a shifting to the left of the graph 88 indicates that the target is receding from the antenna 28.

The estimator 68 is seen to comprise a threshold unit 90, a computation unit 92, a selector 94, a multiplier 96, and a source 98 of a scale factor for use in the multiplication operation of the multiplier 96. The threshold unit 90 comprises a gate 100, a comparator 102, and a source 104 of a reference signal for use by the comparator 102. The selector 94 comprises a memory 106, an address generator 108 for addressing the memory 106, gates 110 and 112, a comparator 114, registers 117, 118 and 119, adders 121 and 122, and encoder 124.

The spectral terms on line 82 are coupled sequentially through the threshold unit 90 to the selector 94. The comparator 102 in the threshold unit 90 compares the amplitudes of each of the spectral terms with a reference signal from the source 104 to insure that only such terms as are above the noise level are coupled to the selector 94. In the case of spectral terms having an amplitude greater than that of the reference, the comparator 102 activates the gate 100 to pass the spectral term to the selector 94. Spectral terms having an amplitude lower than the threshold are inhibited by the gate 100 from entering the selector 94.

The selector 94, as will be described hereinafter, stores the values of the spectral lines in the memory 106. The values of the $J_0$ term and the $J_1$ terms are read out of the memory 106 into the computation unit 92 which, as seen by the formula in FIG. 4, computes the sum of the positive and negative $J_1$ terms, and then divides the sum by the magnitude of the $J_0$ term to provide the range error signal on line 84. As noted hereinabove, the presence of the higher-order terms shown an error in the estimate of the target range and of the round-trip propagation time such that the range estimate does not coincide with the received echo. Essentially, only the $J_1$ term appears for a slight error in the range estimate. Further Bessel terms such as the $J_2$ and the $J_3$ terms appear in the presence of successively poorer estimates of the target range. However, even though the higher-order terms are representative of an error in the range estimate, the $J_1$ and the $J_0$ terms, provide a sufficiently accurate measure of the range error for frequency modulation indices of the modulator 44 which are less than or equal to unity. Also, even in the situation of a varying radial velocity of the target, the compensation provided by the inner loop of FIG. 1 results in the presence of primarily the $J_0$ and $J_1$ terms in the spectrum after the inner loop has provided its compensation. Accordingly, a sufficiently accurate representation of the error signal is obtained by the computation involving only the $J_1$ and $J_0$ terms.

The selector 94 selects the $J_0$ term and the two $J_1$ terms from the error spectrum provided by the transformer 66. The selection is accomplished by detecting the spectral line with the largest amplitude, this line being the $J_0$ term. The two $J_1$ terms are then understood to be equally spaced about the $J_0$ term at a spacing equal to multiples of the FFT spectral resolution or spacing of the output slots of the transformer 66. For example, in the event that the spectral resolution is half of the modulation frequency, as in the aforementioned exemplary modulation frequency of 100 Hz with a spacing of 50 Hz between output slots of the transformer 66, then the $J_1$ terms are spaced apart from the $J_0$ term by two of the frequency slots. In the event that the transformer 66 provides a finer frequency resolution with a slot spacing of only 25 Hz, then the 100 Hz line spacing of the spectral lines in the graph 88 is equal to a spacing of four frequency slots of the transformer 66. In the addressing of the memory 106 by the address generator 108, it is noted that the generator 108 is strobed by clock pulses from the clock 46 of FIG. 1 as is the transformer 66 so that the generator 108 can address a separate slot in the memory 106 corresponding to each output frequency slot of the transformer 66. Accordingly, as the spectral lines are sequentially presented by the transformer 66 to the estimator 68, each of the spectral lines which are passed by the threshold unit 90 are sequentially stored in the memory 106 at locations corresponding to the locations of the frequency slots of the transformer 66. Upon determining the address of the largest spectral line, the $J_0$ term, the addresses of the two $J_1$ terms are then obtained by simply adding an integer to the address and subtracting the integer from the address of the $J_0$ term wherein the integer is equal to the foregoing number of frequency slots between the spectral lines and the graph 88. The integer is identified by the legend k in FIG. 4.

The spectral lines coupled from the threshold unit 90 to the memory 106 are also coupled to the gate 110 and to the comparator 114 which compares the magnitude of each spectral line to the magnitude of the largest previously occurring spectral line. The magnitude of the largest previously occurring spectral line is stored in the register 117. When the magnitude of the most recent spectral line exceeds that which is stored in the register 117, the comparator 114 activates the gate 110 for entering the larger spectral line into the register 117, the register 117 then discarding the previously stored spectral line. In addition, the gate 110 also applies to the register 118 the address of the most recent spectral line, the address being the same address as is applied by the generator 108 to the memory 106. Thus, the two registers 117-118 store both the magnitude and the address of the largest spectral line. It is recalled that the amplitude of the largest spectral line, the $J_0$ term represents the strength of the echo signal, while the position of the $J_0$ term along the frequency axis, the position being designated by the address of the frequency slot of the transformer 66, is a measure of the Doppler frequency and range rate of the target. Accordingly, at the conclusion of the transmission of the sequence of spectral lines from the threshold unit 90 to the memory 106, a clock signal from the clock 46 of FIG. 1 strobes the gate 112 to pass the address of the $J_0$ term from the register 118 to the multiplier 96. The multiplier 96 then multiplies the address by a scale factor from the source 98 to convert the address to the range rate which appears on line 86 and, as noted above, is proportional to both the address and to the Doppler frequency.

In order to obtain the addresses of the two $J_1$ terms, the foregoing integer k is to be added to the address of the $J_0$ term to obtain the address of the $J_1$ term to the right of the $J_0$ term in the graph 88, the integer k being subtracted from the address of the $J_0$ term to provide the address of the $J_1$ term to the left of the $J_0$ term in the graph 88. The integer k is provided by a source 124 of a digital signal, such as an encoder, for setting the spacing of the spectral lines on the graph 88 in accordance with the number of resolution elements, or frequency slots, of the transformer 66 between adjacent ones of the spectral lines of the graph 88. The adder 121 sums together the value of k with the address of the $J_0$ term while the adder 122 subtracts the value of k from the address of the $J_0$ term. The output signals of the adder 121 and 122 are the addresses of the $J_1$ terms, these addresses being stored in the register 119. The strobe signal from the clock 46 of FIG. 1 strobes the register 119 to address the memory 106 to read out the stored $J_0$ and $J_1$ terms from the memory 106 to the computation unit 92. The computation unit 92 then performs the aforementioned computation with the spectral terms to provide the range error signal on line 84.

Referring now to FIG. 5, there is seen a block diagram of the range tracking filter 70 of FIG. 1 which receives the range error signal on line 84 and provides the range on line 126. The filter 70 comprises summers 129-130, multipliers 133-134, sources 137-138 of signals serving as scale factors, and integrators 141-142. The components of the filter 70 may function in either an analog fashion or in a digital fashion. In the analog case, the signals on lines 84 and 126 are understood to be analog voltages having amplitudes which represent, respectively, the range error and the range. The summers 129-130 are in the form of operational amplifiers having summing input terminals. The multipliers 133-134 are in the form of gain control amplifiers wherein the scale factors from the sources 137-138 are analog voltages which are applied to the gain control terminal. The integrators 141-142 take the form of operational amplifiers having a capacitor in the feedback circuit to provide the function of an integrator. In the event that the components of the filter 70 are to function in a digital fashion, the signals on the lines 84 and 126 have a digital format, it being understood that the computation unit 92 of FIG. 4 would provide a digitally formatted signal on line 84. The summers 129-130 take the form of digital adders, the multipliers 133-134 are digital multipliers, the scale factor signals are digital signals, and the integrators 141-142 may be any one of a number of well-known digital integrating circuits as are commonly employed in computers and other digital equipment.

The filter 70 is in the form of a second order filter in view of the double integration provided by the integrators 141-142. The integrator 141 includes a feed forward path comprising the multiplier 134 and the summer 130. The output signal at line 126 is fed back to the input summer 129 wherein the output signal is subtracted from the signal on line 84. The time constant and response time of the filter 70 is selected by the magnitude of the scale factor from the source 138, that factor being multiplied in the multiplier 134 by the signal on line 144. The overall loop gain is selected by the magnitude of the scale factor from the source 137, that factor being multiplied in the multiplier 133 by the signal on line 146. The output signal of the filter 70 on line 126 is proportional to the range of the target from the antenna 28 in FIG. 1, the signal on line 126 being applied to the display 34 of FIG. 1 for displaying the range, and to the oscillator 80 for providing the sinusoid on the line D having the frequency proportional to the range as has been described hereinabove.

Referring now to FIG. 6, the range rate tracking filter 72 filters the range rate signal on line 86 to provide a filtered range rate signal on line 148 for the acceleration estimator 74 on FIG. 1. The filter 72 comprises a multiplier 150, a source 152 of a scale factor, a summer 154 and a delay unit 156. The components of the filter 72 may operate in either an analog or digital fashion, as was described with reference to the filter 70 of FIG. 5. Assuming a digital implementation of the filter 72 of FIG. 6, the delay unit 156 provides a delay equal to the batch interval as was described previously with reference to the sampling rate of the transformer 66 of FIG. 1. Thus, it is seen that the signal on line 86 is summed, via the summer 154, with the previously occurring signal, the previously occurring signal having been delayed by the delay unit 156. In addition, the previously occurring signal, before being applied to the summer 154, is scaled at the multiplier 150 by the scale factor of the source 152. The scale factor is less than unity so that the previously occurring sample is reduced in amplitude before being summed with the present sample on line 86 at the summer 154. The procedure repeats with the foregoing sum being scaled and summed together with the next sample on line 86. The configuration of the filter 72 is sometimes referred to as a one-pole integrator.

Referring now to FIG. 7, the acceleration estimator 74 provides the derivative of the input range rate signal on line 148, the derivative appearing at the output terminal on line 158. The estimator 74 comprises two delay units 161-162, two summers 165-166, two multipliers 169-170 and two sources 173-174 of scale factors for use by the multipliers 169 and 170. The summer 165 forms the difference between a sample of the range rate and the previous sample of the range rate. The delay of the delay unit 161, as well as the delay of the delay unit 162, are the same as the delay of the delay unit 156 of FIG. 6. The scale factor of the source 173 is proportional to the reciprocal of the batch interval so that, upon multiplying the output sum of the summer 165, at the multiplier 169 by the scale factor of the source 173, the sum of the summer 165 is effectively divided by the length of time of the batch interval. Thus, the output signal of the multiplier 169 is in the form of the derivative of the range rate, the derivative being recognized as the ratio of the difference of two samples of the range rate divided by the time interval between the two samples. The summer 166, the delay unit 162, the multiplier 170 and the source 174 are seen to correspond with, and to function as, the components of the filter of the FIG. 6. Thus, the output signal of the estimator 74 on line 158 is the filtered derivative of the range rate of the input signal on line 148.

With reference also to FIG. 1, the range rate signal on line 86 and the derivative thereof on line 158 are coupled to the display 34 for the displaying of the range rate, or target velocity, and the derivative thereof, namely, the target acceleration. The sense of the target acceleration on line 158 is inverted by the inverter 76 to provide the compensation for the acceleration at the mixer 62. The generator 78 provides a sinusoidal signal having a frequency which is swept linearly in time, the rate of sweep being proportional to the amplitude of the signal applied to a control terminal of the generator 78 by the inverter 76. Thus, in the absence of target acceleration, the rate of frequency sweeping is zero with the result that the output frequency of the generator 78 is constant. As the target recedes from the antenna 28, or draws near to the antenna 28, the effect of the radial acceleration on the range estimate at the output terminal of the mixer 62 is compensated by the swept frequency of the generator 78. Due to the compensation, the energies of the spectral terms on line 82 (portrayed in the graph 88 of FIG. 4) do not spill over into adjacent frequency slots of the transformer 66 with the result that the $J_0$ and $J_1$ terms predominate to provide a well defined error signal on line 84 for operating the outer loop to provide the desired range on line 126 and the corresponding frequency offset on line D. Thus, the spectrum of the difference between the range estimate and the echo has been utilized to provide the range, the radial velocity and the radial acceleration of the target.

It is understood that the above-described embodiment of the invention is illustrative only and that modifications thereof may occur to those skilled in the art. Accordingly, it is desired that this invention is not to be limited to the embodiment disclosed herein but is to be limited only as defined by the appended claims.

We claim:

1. An echo measurement system comprising:
means for transmitting a signal to a target, said transmitting means providing a replica of said signal, said signal including a modulation of a frequency thereof with a periodic modulation pattern;
means for receiving said signal as reflected from said target, said receiving means including means for modifying said replica to compensate for the effects of target movement on the frequency spectrum of said signal; and
wherein said modifying means includes means for multiplying said replica by said signal, analyzer means for providing a set of spectral lines of a product of said multiplying means, and means responsive to the differences among spectral lines of said product for modifying said replica with a compensating signal to null the effects of said target movement, said compensating signal having range data therein.

2. A system according to claim 1 wherein said multiplying means is a mixer providing a frequency difference between the frequencies of said received signal and said replica.

3. A system according to claim 2 wherein said periodic modulation pattern is a sinusoid, and wherein said modifying means comprises means for providing a range signal proportional to the range of said target and a range rate signal proportional to the range rate of said target.

4. A system according to claim 3 wherein said modifying means includes means responsive to said range rate for providing a frequency swept signal having a sweeping rate proportional to the derivative of said range rate, said modifying means further including mixing means coupled to said swept signal and said range signal for modulating said replica with said compensating signal.

5. A system comprising:
means for transmitting a signal having a modulation pattern thereon, and means for receiving said signal at a time subsequent to the transmission of said signal, said transmitting means including means for coupling a replica of said signal to said receiving means;
said receiving means including means for extracting spectral lines of the spectrum of a difference signal, and means coupled between said receiver and said extracting means, and responsive to the relative magnitudes of said spectral lines for modifying said replica to bring its modulation pattern into coincidence with a modulation pattern of the signal received by said receiver; and
said receiving means further including means coupled to said modifying means for combining said received signal with said modified replica to provide said difference signal, said modifying means providing data relating to the propagation of the signal transmitted by said transmitter to said receiver.

6. A system according to claim 5 wherein said modulation pattern is a periodic pattern characterized by a line spectrum, and wherein said modifying means comprises means for comparing the magnitude of one of said spectral lines with another of said spectral lines.

7. A system according to claim 5 wherein said extracting means incorporates a Fourier transformer, and wherein said extracting means includes means for forming the ratio of the sum of two spectral lines of said spectrum divided by the magnitude of a larger spectral line therebetween to provide a quotient, an address of said larger spectral line being proportional to a rate of change in the length of a path of said signal propagation, and said quotient being proportional to an error in said coincidence.

8. A system according to claim 7 wherein said modifying means includes means responsive to the frequency represented by said larger spectral line for providing a signal proportional to the second derivative of the length of said propagation path, and means proportional to said second derivative signal for generating a swept frequency signal having a rate of frequency sweeping proportional to said second derivative signal.

9. A system according to claim 8 wherein said modifying means including means for mixing said swept frequency signal with said replica, and wherein said modulation pattern is a sinusoid providing a spectrum to said difference signal characterized by a set of Bessel terms.

10. A system according to claim 9 wherein said modifying means further includes a second order tracking filter and a variable frequency oscillator coupled thereto, a signal proportional to said quotient being coupled to said tracking filter for driving said oscillator to provide a frequency proportional to the length of said path of signal propagation, an output signal of said oscillator being mixed with said replica.

* * * * *